April 21, 1936.  H. J. HORN  2,037,981
VEHICLE WHEEL
Filed Nov. 25, 1932
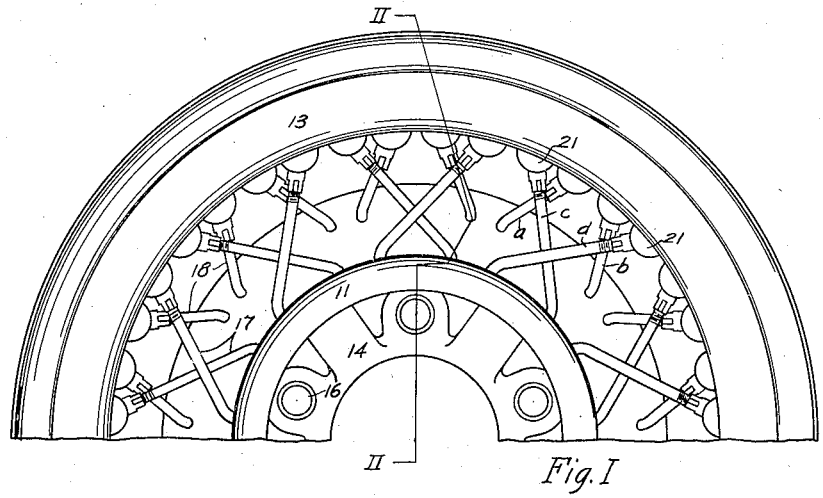
Fig. I
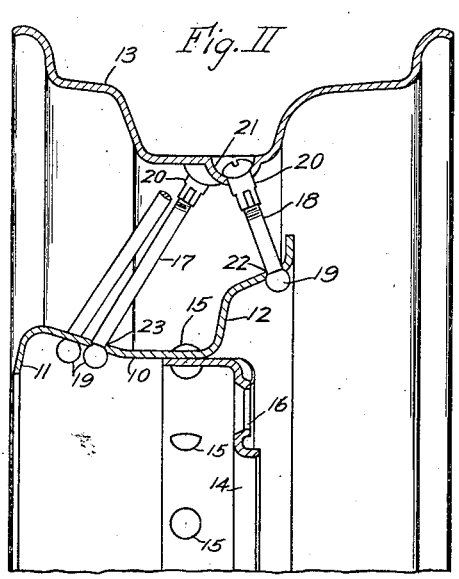
Fig. II
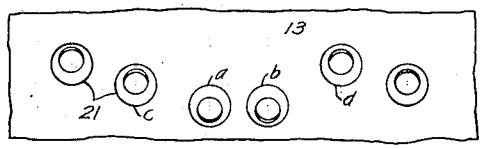
Fig. III
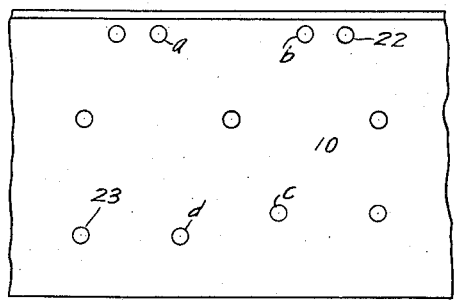
Fig. IV
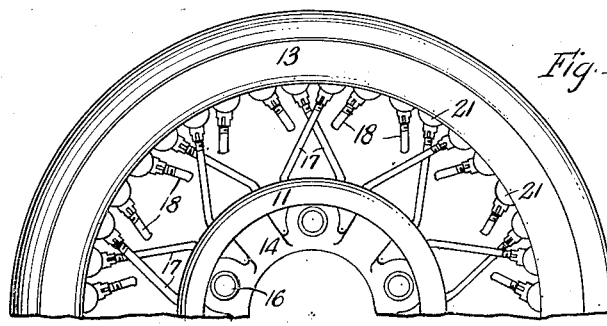
Fig. V
INVENTOR.
Harry J. Horn
Carroll R. Taber
HIS ATTORNEY.

Patented Apr. 21, 1936

2,037,981

UNITED STATES PATENT OFFICE

2,037,981

VEHICLE WHEEL

Harry J. Horn, Lansing, Mich., assignor to Motor Wheel Corporation, Lansing, Mich., a corporation of Michigan Application November 25, 1932, Serial No. 644,261

4 Claims. (Cl. 301—55)

This invention relates to vehicle wheels and more particularly to wheels embodying wire spokes. The principal object of the invention is the provision of a wire wheel of small diameter embodying a novel arrangement of the wire spokes.

In conventional wire wheels the spokes are usually arranged in two series, one series being connected to the forward portion of the hub shell at their inner extremities and the other series being connected to the rear edge of the hub shell at their inner extremities. The spokes of each series are inclined toward each other or intersect at their outer extremities which are connected to the rim. By this arrangement of the two series of spokes the wheel is strengthened against lateral strains. In order to provide the necessary torsional strength the spokes of each series are normally arranged in intersecting relation to each other.

The conventional arrangement of wire spokes cannot be used in the present day wheel of small rim diameter and large hub shell diameter because of the limited space available for the spokes. Considerable difficulty has been experienced in arranging wire spokes in wheels of small diameter whereby to provide a wheel of sufficient strength and durability. This invention provides a novel arrangement of parts adapted to overcome the difficulty heretofore experienced in the manufacture of small diameter wire wheels.

For a better understanding of the invention reference may now be had to the accompanying drawing in which:

Figure I is a partial view in side elevation of a wheel embodying the invention;

Figure II is a sectional view taken on substantially the line II—II of Figure I;

Figure III is a partial plan view of the base of the rim showing the arrangement of the openings through which the outer extremity of the spokes extend; and Figure IV is a partial plan view of a hub shell showing the arrangement of the openings through which the inner extremities of the spokes extend.

Figure V is a partial view in side elevation of a wheel embodying a modified form of the invention.

The vehicle wheel illustrated in Figures I and II consists of a generally cylindrical hub shell 10 provided with an inturned flange 11 at its forward extremity and an outwardly turned flange 12 at its rear extremity. A hub attaching flange 14 is preferably secured to the rear extremity of the hub shell 10 by the rivets 15. The hub attaching flange 14 is provided with a plurality of suitable openings 16 for the reception of conventional securing bolts whereby the wheel is removably attached to a hub flange.

The hub shell 10 is disposed within and in concentric relation to a tire carrying rim 13 of the drop center type. Any other type of rim or felloe may be used, if desired. The rim 13 and hub shell 10 are connected together by means of a series of relatively long spokes 17 and a series of relatively short spokes 18.

All of the spokes 17 and 18 are of the so-called nipple type and each consists of a metal rod provided with a head 19 at one extremity and with exterior threads at the opposite extremity. The threaded extremity of the spoke is inserted into an interiorly threaded nipple 20 provided with a slot on its outer surface for the reception of a suitable tool whereby the same may be rotated to engage the threads of the spoke. The nipple end of the spoke is preferably connected to the rim, the base of which is provided with a plurality of suitably arranged depressions or bubbles 21 having central openings for the reception of the nipples. Any type of spoke, such as the so-called welded or riveted spoke, may be used in place of the spokes here shown and described, if desired.

The short spokes 18 connect the rim 13 to the outwardly extending flange 12 formed at the rear of the hub shell 10. They are installed by inserting the threaded extremities thereof through openings 22 formed in the flange 12. When the nipple 20 is tightened upon the threaded extremity of the spoke the head 19 thereof is drawn against the inner surface of the flange 12 about the opening 22. The long spokes 17 connect the rim 13 to the forward edge of the hub shell 10. They are installed by inserting the threaded extremities thereof through openings 23 provided for that purpose. They are then secured to the nipples 20 in the same manner as the spokes 18.

The spokes 17 and 18 are arranged in groups of four. The method of grouping is illustrated in Figure I by the spokes designated as *a*, *b*, *c* and *d*. It will be observed that each group includes two of the long spokes 17 and two of the short spokes 18. The order in which the spokes are secured to the rim and hub shell is illustrated in Figures III and IV wherein the openings through which the spokes of the group shown in Figure I extend are identified by the corresponding letters *a*, *b*, *c* and *d*.

The spokes a and b are spaced from each other and their outer extremities connected to the rim 13 are inclined toward each other. The spokes c and d are connected to the rim 13 at the opposite sides of the spokes a and b and are inclined toward each other whereby they intersect adjacent the hub shell 10. The inner extremities of the spokes c and d are connected to the hub shell at points which lie in radial planes intermediate the radial planes of the openings to which the spokes a and b are connected. In this manner a very strong wheel is formed since the longitudinal planes of the spokes c and d intersect each other, and the longitudinal plane of each intersects the longitudinal plane of one of the spokes a and b. This arrangement together with the inclination of the spokes a and b toward each other at their outer extremities provides the necessary torsional strength in the wheel.

The arrangement of the spokes 17 and 18, as shown in Figure II with their outer extremities inclined toward each other, provides the necessary lateral strength for the wheel.

In the modified construction shown in Figure V the long spokes 17 and the short spokes 18 are arranged in groups of four as previously described in connection with the wheel shown in Figures I and II. However, the spokes within the group are arranged in a different manner. In this case the long spokes 17 intersect each other adjacent their outer extremities and do not intersect the longitudinal plane of the shorter spokes. The short spokes do not intersect each other and are arranged with their outer extremities inclined away from each other. As in the embodiment shown in Figures I and II the longer intersecting spokes 17 and the shorter spaced apart spokes 18 are inclined toward each other at their outer extremities.

It should be observed, disregarding the grouping as previously described, that the spokes in both forms of the invention are connected to the rim 13 in pairs, alternate pairs having their inner extremities connected to opposite edges of the hub shell and each pair having their outer extremities relatively close together and their inner extremities relatively remote from each other. By this arrangement the maximum number of spokes may be utilized whereby to provide the necessary strength and durability for the wheel as a whole.

The scope of the invention is indicated in the appended claims.

I claim:

1. In a vehicle wheel including a hub shell and a rim disposed in concentric relation to each other, means for connecting the hub shell and rim together consisting of a plurality of tension wire spokes arranged in groups of four, each group including a pair of intersecting spokes and a pair of spaced apart spokes, the outer extremity of each spoke in said last mentioned pair of spokes being inclined toward the outer extremity of the other spoke in the same pair, the outer extremities of both spokes in each of the aforesaid pairs of spokes being inclined toward but spaced from the outer extremities of the spokes in the other pair.

2. In a vehicle wheel including a hub shell and a rim disposed in concentric relation to each other, means for connecting the two together consisting of a plurality of groups of tension spokes, each group of tension spokes including a pair of short spokes spaced from each other but inclined toward each other at their outer extremities and a pair of relatively long spokes intersecting each other adjacent their inner extremities and having their outer extremities connected to the rim at the opposite sides of the pair of short spokes the outer extremities of the long and short spokes being inclined toward each other.

3. In a vehicle wheel including a hub shell and a rim disposed in concentric relation to each other, means for connecting the two together consisting of a plurality of identical groups of tension spokes, each group including a pair of intersecting tension spokes connected at their inner extremities to the forward portion of the hub shell and a pair of spaced apart spokes connected at their inner extremities to the rear portion of the hub shell the outer extremities of said pairs of spokes being inclined toward each other.

4. In a vehicle wheel including a hub shell and a rim disposed in concentric relation to each other, means for connecting the two together consisting of a series of tension spokes having their opposite extremities connected to the forward portions of the hub shell and rim respectively, said spokes being arranged in pairs with their outer extremities inclined toward the rear of the wheel, each spoke of each of said pairs intersecting the other spoke of that pair, and a second series of tension spokes having their opposite extremities secured to the rear portions of the hub shell and rim respectively, each of the spokes of said second series of spokes being spaced throughout its length from the next adjoining spokes and having its outer extremity inclined toward the front of the wheel.

HARRY J. HORN.